United States Patent [19]

Szazy

[11] Patent Number: 5,042,778
[45] Date of Patent: Aug. 27, 1991

[54] WEED PULLER APPARATUS

[76] Inventor: Frank Szazy, 32605 22nd Ave. S., Roy, Wash. 98580

[21] Appl. No.: 493,695

[22] Filed: Mar. 15, 1990

[51] Int. Cl.$^5$ .............................................. B66F 3/00
[52] U.S. Cl. .................................. 254/132; 172/310
[58] Field of Search ............ 254/132, 133 R; 37/2 R, 37/2 P; 172/353, 370; 30/297; 294/50.8, 51, 59, 60

[56] References Cited

U.S. PATENT DOCUMENTS

| | | | |
|---|---|---|---|
| 2,928,655 | 3/1960 | Armstrong | 254/132 |
| 3,865,348 | 2/1975 | Close | 252/132 |
| 4,135,700 | 1/1979 | Arzoian | 254/132 |
| 4,809,687 | 3/1989 | Allen | 269/328 |

*Primary Examiner*—J. J. Hartman
*Attorney, Agent, or Firm*—Leon Gilden

[57] ABSTRACT

A weed puller apparatus is arranged for securement about a foot of an individual utilizing forward and rear spine plates to adjust the apparatus relative to the foot or shoe of the individual. A forward bifurcated plate enables securement about an associated weed for removal of the weed.

1 Claim, 5 Drawing Sheets

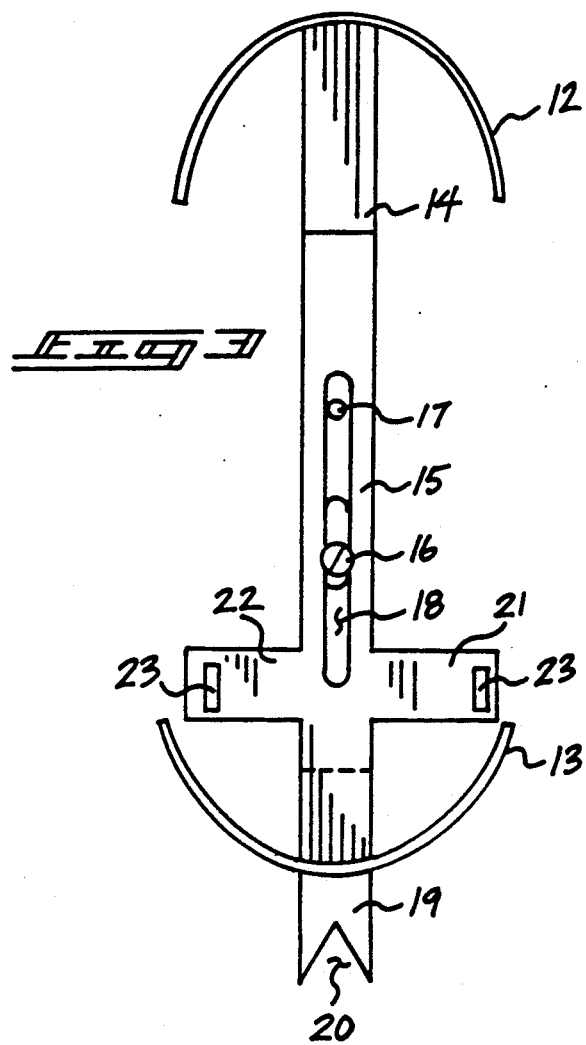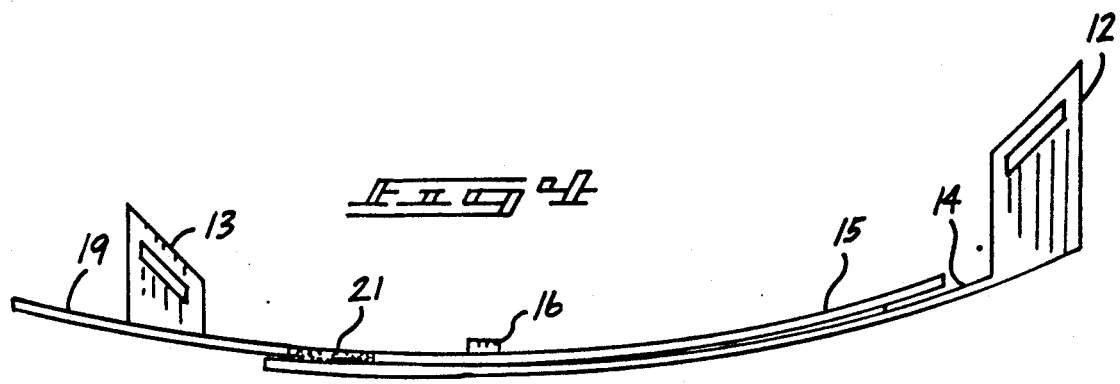

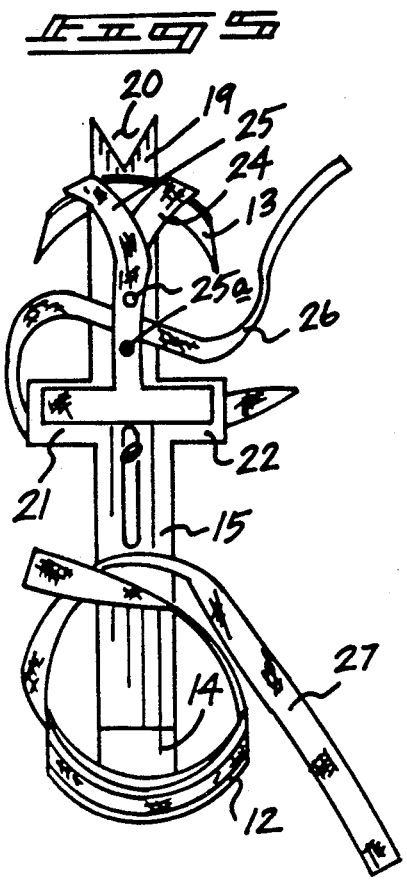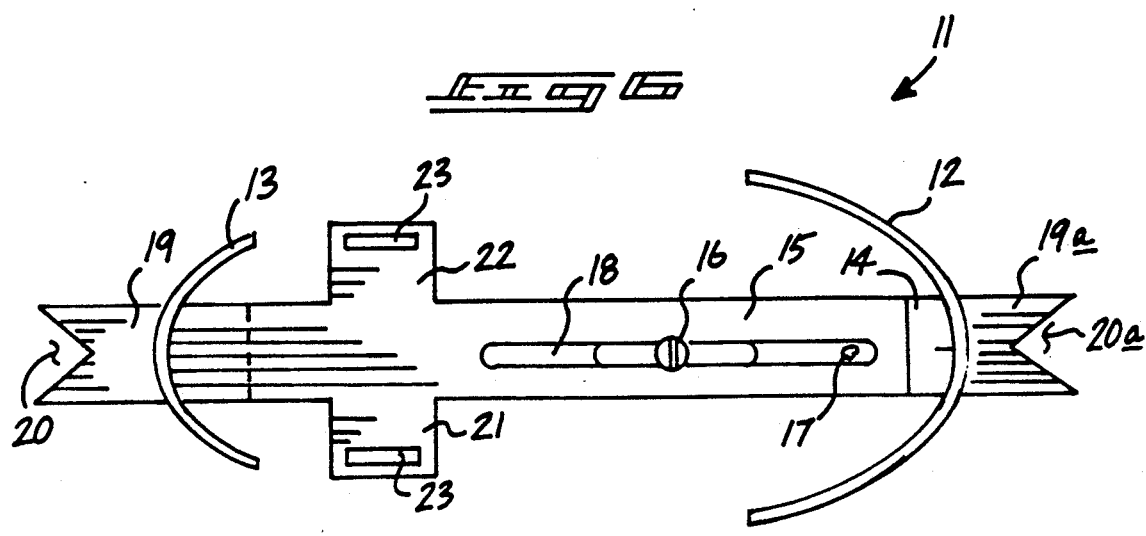

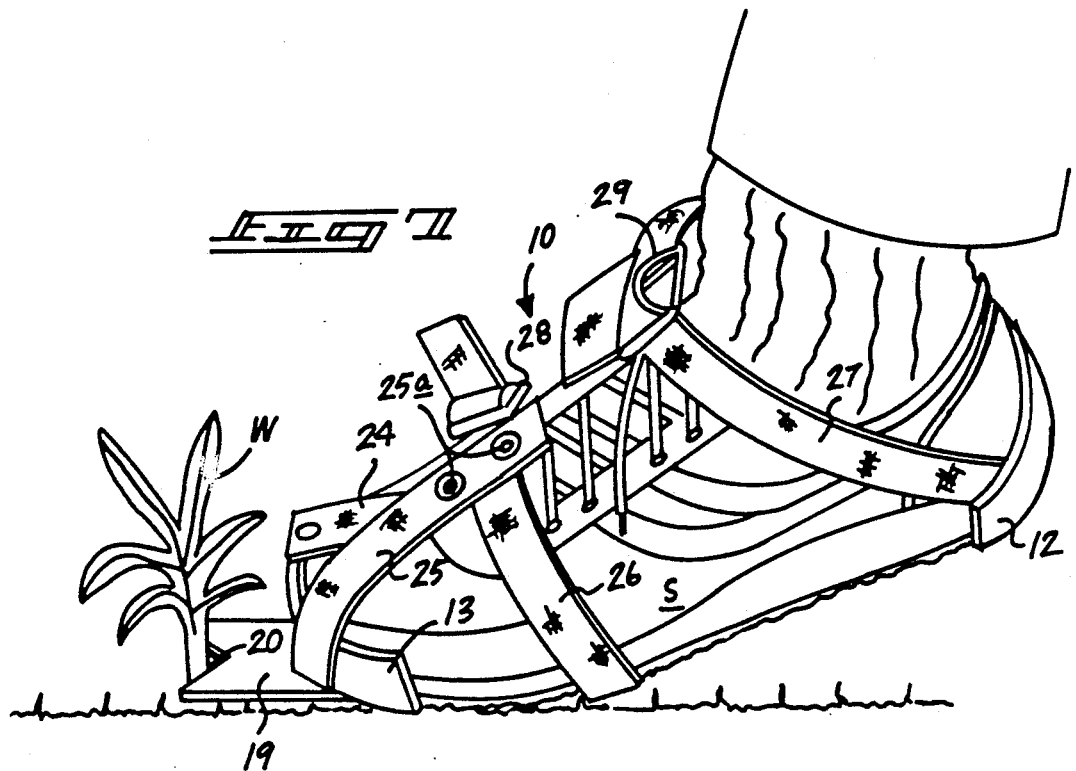
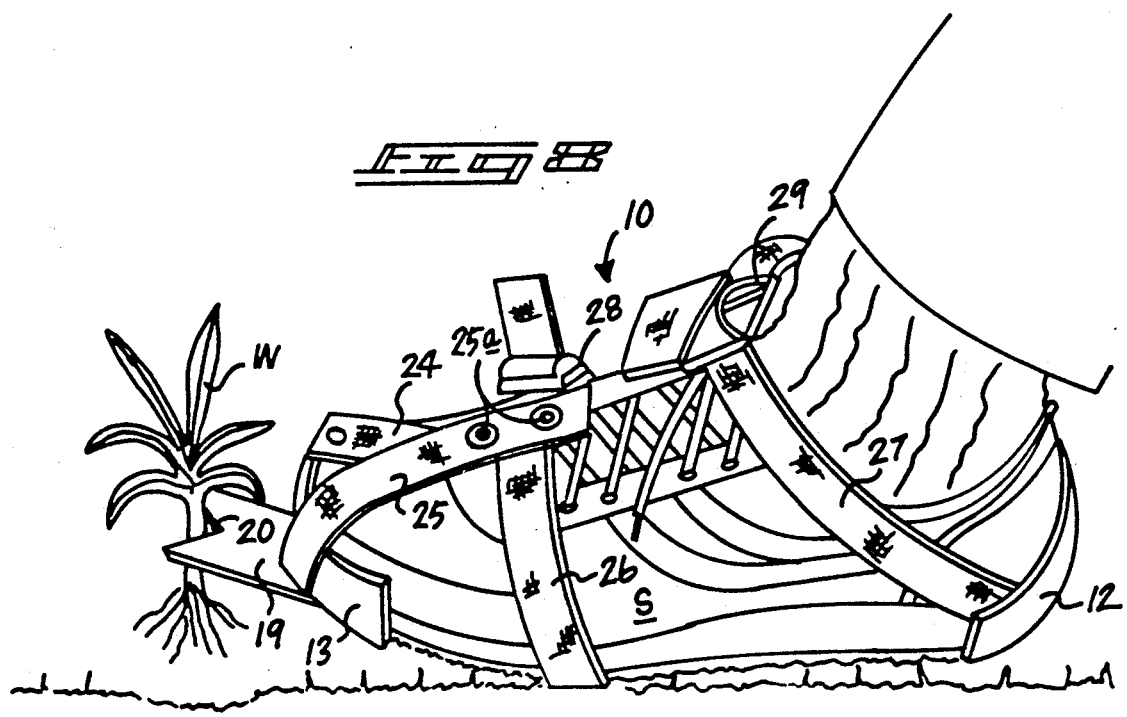

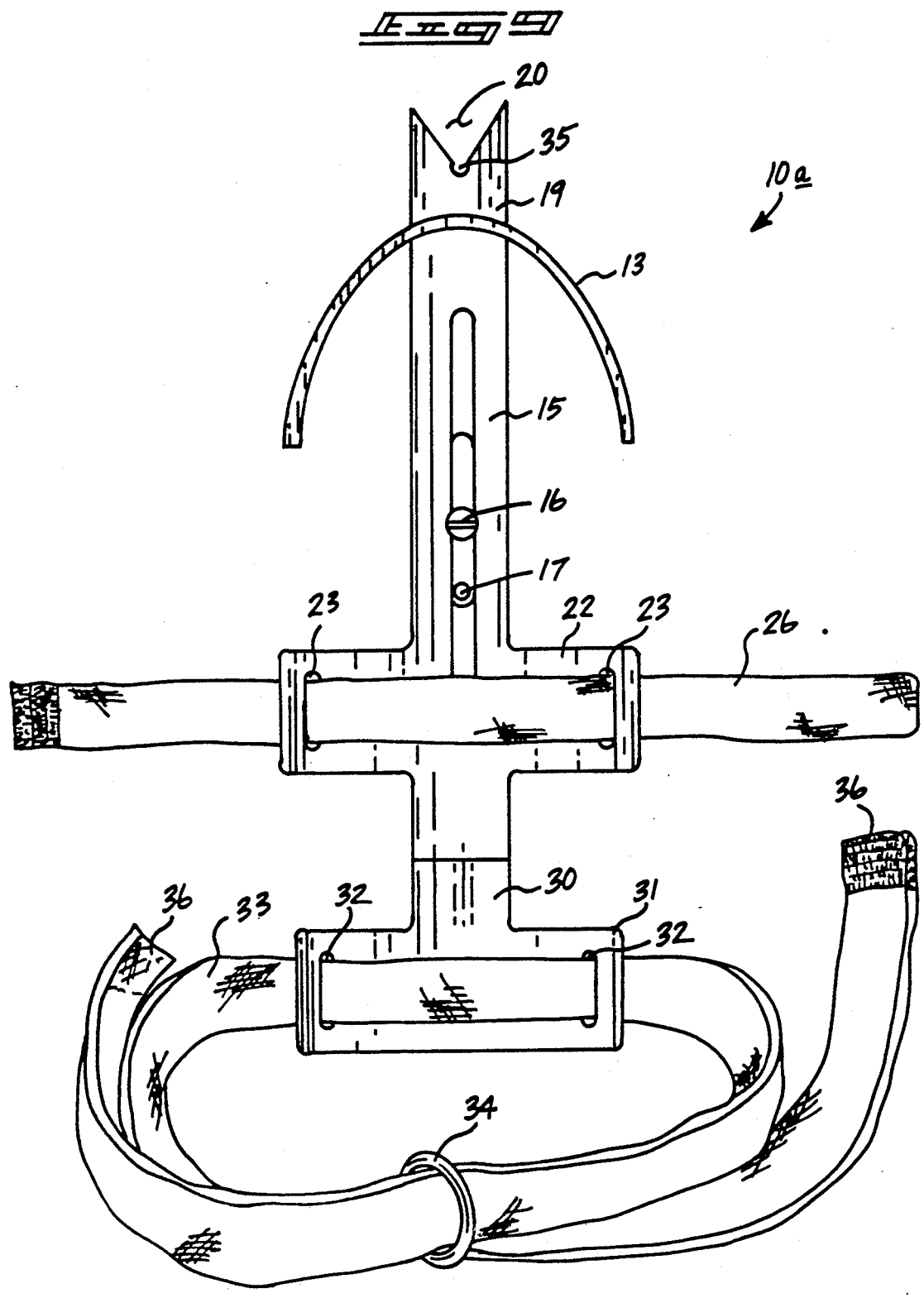

WEED PULLER APPARATUS

BACKGROUND OF THE INVENTION

1. Field of the Invention

The field of invention relates to weed pulling apparatus, and more particularly pertains to a new and improved weed puller apparatus which may be selectively secured to an individual's foot for effecting ambulatory and selective weeding of desired locations.

2. Description of the Prior Art

The prior art has set forth various weed pullers for use in removal of undesirable growth. Such apparatus, however, has heretofore been of a cumbersome or awkward nature in use requiring bending and manipulation of such apparatus to the detriment of individuals with impaired physical abilities, such as bad backs and the like. Examples of the prior art include U.S. Pat. No. 3,865,348 to Close wherein a weed pulling apparatus is provided with an elongate handle and a bifurcated weed pulling element positioned remotely relative to the handle with a rearwardly positioned foot operative leverage portion to remove weeds by the bifurcated plate.

U.S. Pat. No. 3,985,382 to Wheeler provides a weed puller formed with an elongate shank with an upper loop for receiving an individual hand therethrough, with a lowermost end formed with a claw portion for removal of weeds.

U.S. Pat. No. 4,673,165 to Nelson sets forth an elongate handle formed with a plurality of downwardly projecting prongs with a fulcrum portion extending orthogonally relative to a lowermost end of the handle for leveraging weeds from soil.

U.S. Pat. No. 4,274,619 to Redmond sets forth a plier like implement for grasping weeds therebetween to effect their removal manually.

U.S. Pat. No. 4,135,700 to Arzoian sets forth an elongate loop member formed with a forward projection extending from a base thereof to enable fulcruming of the apparatus relative to a weed fixed within a soil environment.

As such, it may be appreciated that there is a continuing need for a new and improved weed puller apparatus wherein the same addresses both the problems of ease of use and effectiveness in construction, and in this respect, the present invention substantially fulfills this need.

SUMMARY OF THE INVENTION

In view of the foregoing disadvantages inherent in the known types of weed pulling apparatus now present in the prior art, the present invention provides a weed puller apparatus wherein the same is selectively securable to a foot of an individual for selective weed removal. As such, the general purpose of the present invention, which will be described subsequently in greater detail, is to provide a new and improved weed puller apparatus which has all the advantages of the prior art weed removal apparatus and none of the disadvantages.

To attain this, the weed puller apparatus of the instant invention includes a rear arcuate brace and a forward arcuate brace whose convex surfaces are in confronting relationship relative to one another and including a rear and forward arcuate spine integrally secured to the respective rearward and forward arcuate braces, wherein the spines are adjustable relative to one another to accommodate various shoe length dimensions. A forwardly extending bifurcated plate oriented upwardly in the same radius of curvature as the forward spine includes a "V" shaped notch for receiving a weed stem therebetween to effect its subsequent removal upon a fulcruming of the apparatus upwardly about the arcuate curvature of the rear and forward spines when secured together. Overlying straps and associated buckles secure the apparatus to an associated foot.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved weed puller apparatus which has all the advantages of the prior art weed removal apparatus and none of the disadvantages.

It is another object of the present invention to provide a new and improved weed puller apparatus which may be easily and efficiently manufactured and marketed.

It is a further object of the present invention to provide a new and improved weed puller apparatus which is of a durable and reliable construction.

An even further object of the present invention is to provide a new and improved weed puller apparatus which is susceptible of a low cost of manufacture with regard to both materials and labor, and which accordingly is then susceptible of low prices of sale to the consuming public, thereby making such weed puller apparatus economically available to the buying public.

Still yet another object of the present invention is to provide a new and improved weed puller apparatus which provides in the apparatuses and methods of the prior art some of the advantages thereof, while simultaneously overcoming some of the disadvantages normally associated therewith.

Still another object of the present invention is to provide a new and improved weed puller apparatus wherein the same is selectively securable to an individual's foot to enable weed removal without associated bending and twisting of an individual during a weed pulling operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic view of the instant invention.

FIG. 4 is an orthographic side view taken in elevation of the instant invention.

FIG. 5 is a top orthographic view of the instant invention and the associated straps.

FIG. 6 is a top orthographic view of a modification of the instant invention.

FIG. 7 is an isometric illustration of the instant invention in an initial position engaging an associated weed.

FIG. 8 is an isometric illustration of the instant invention subsequent to a leveraging of the weed and its removal from the soil.

FIG. 9 is a top isometric illustration of a modification of the instant invention.

DESCRIPTION OF THE PREFERRED EMBODIMENT

Figure 1:
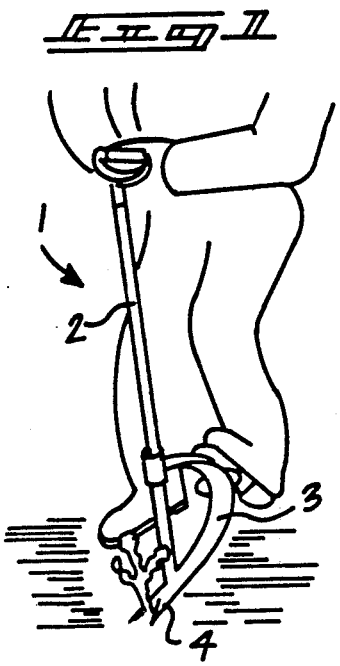
FIG. 1 is an isometric illustration of a prior art weed puller device.
Figure 2:
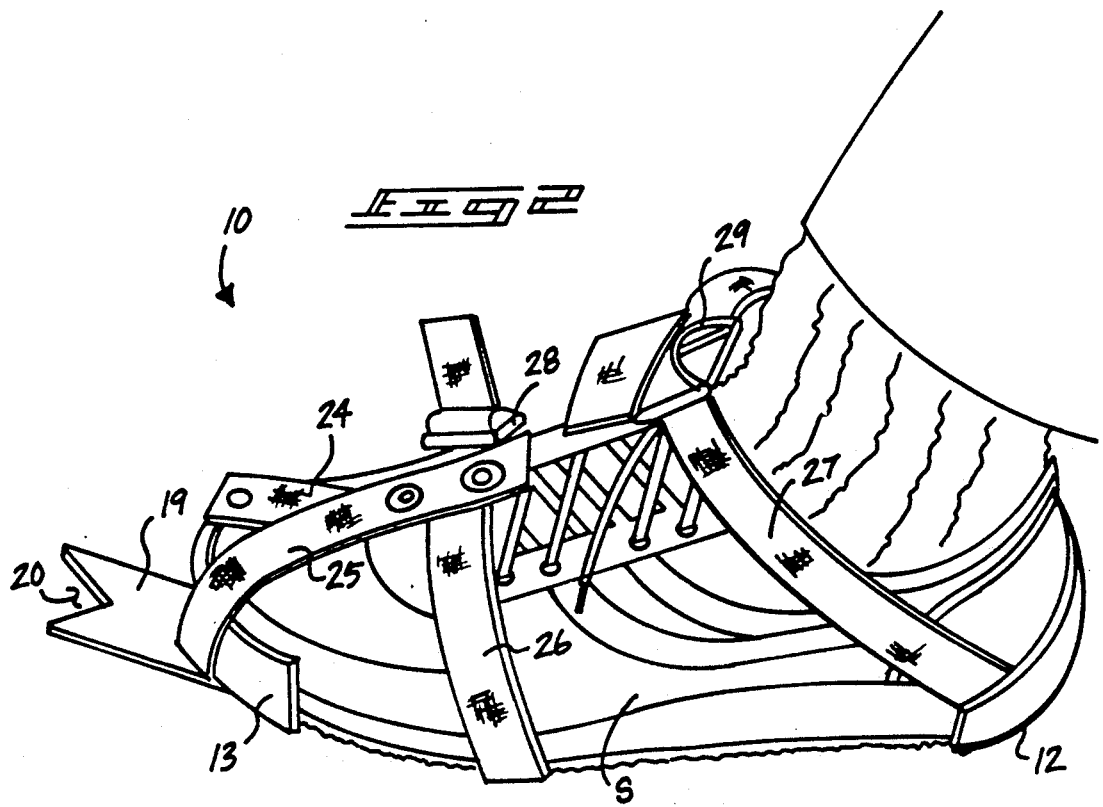
FIG. 2 is an isometric illustration of the instant invention secured to an associated shoe.

With reference now to the drawings, and in particular to FIGS. 1 to 9 thereof, a new and improved weed puller apparatus embodying the principles and concepts of the present invention and generally designated by the reference numerals 10, 10a, and 11 will be described.

More specifically, the weed puller apparatus 10 of the instant invention comprises an improvement over the prior art wherein a typical prior device 1, as illustrated in FIG. 1, utilizes an elongate handle formed with a fulcruming lever at a lowermost portion of the handle with a forwardly projecting weed griping tool 4 positioned at a lowermost end of the handle.

In contrast, the weed puller apparatus 10 of the instant invention includes an arcuate rear brace 11 aligned with an arcuate forward brace 13 with the concave surfaces of the respective braces in confronting relationship relative to one another. The rear brace 12 is orthogonally fixed to an arcuate bottom spine plate 14 bisecting the arcuate rear brace, wherein the spine plate 14 is adjustably mounted underlying an arcuate top spine plate 15 orthogonally fixed to the arcuate forward brace 13, wherein the plates 14 and 15 bisect the respective arcs defined by the respective braces 12 and 13. A clamp screw 16 is orthogonally directed through a slot 18 formed in a top plate 15 and threadedly received within the bottom plate 14. An alignment boss 17 formed onto the bottom plate 14 and directed upwardly thereof is received within the slot 18, as illustrated in FIG. 3, to align the bottom and top plates 14 and 15 together to avoid pivotment of the bottom plate 14 relative to the top plate 15 about the clamp screw 16. An arcuate bifurcated plate 19 is directed and aligned with the top and bottom plates 14 and 15 extending outwardly of the forward brace 13 and formed with a "V" shaped notch 20 and is defined along the same radius of curvature as the arcuate bottom and top plates 14 and 15, as illustrated in FIG. 4, whereupon an engagement of a stalk of an associated weed "W", as illustrated in FIG. 7, enables a rearward rocking of the apparatus about the convex surfaces of the arcuate bottom and top plates 15 to enable a leveraged withdrawal of an associated weed "W" from its rooted securement within a soil environment, as illustrated in FIG. 8.

A first wing plate 21 is aligned with a second wing plate 22 integrally formed to opposite sides of the top spine plate 15 adjacent the forward brace 13, wherein each wing plate includes a strap slot 23 for receiving an insole strap 26 therethrough, as illustrated in FIG. 5 for example. A first forward strap 24 and a second forward strap 25 are mounted to the forward brace 13 and joined together by spaced rivets 25a to provide capturing of the insole strap 26 therethrough, as illustrated in FIGS. 5, 7, and 8 for example. A forward buckle 28 mounted to the insole strap 26 adjusts and accommodates the insole strap 26 and the first and second forward straps 24 and 25 respectively to an associated shoe "S" with a rear buckle 29 adjustably securing a heel strap 27 mounted to the arcuate rear brace 12 about an associated shoe to secure the shoe at forward and rear portions of the apparatus to effect a non-slip securement of the apparatus of the associated shoe "S".

FIG. 6 notes an embodiment of the instant invention 11 including a rear arcuate, bifurcated plate 19 extending rearwardly of the arcuate rear brace 12 in alignment with the arcuate bottom spine plate 14 to enable an individual to selectively extract weeds forwardly or rearwardly of the orientation of the associated shoe "S" without requiring pivotment and repositioning of an individual to effect this operation.

The modification of the weed puller apparatus 10a, as illustrated in FIG. 9, includes the top spine plate 15 slidably overlying a modified bottom "T" shaped spine plate 30 slidably adjustable thereto, utilizing the clamp screw 15 and alignment boss 17 in a manner as illustrated in the embodiments of numerals 10 and 11. A flange 31 is oriented orthogonally relative to the body of the spine plate 30, and includes a pair of spaced parallel slots 32. A flexible heel belt 33 is directed through the solts 32 and crossed about itself and maintained in a crossed configuration by use of a ring 34 surroundingly encompassing the belt 33 at its crossing to permit use of hook and loop fastener surfaces 36 to secure free terminal ends of the belt 33 together encompassing a heel and ankle portion of an individual's foot positioned within the heel belt 33. The modified weed puller apparatus 10a further includes an improved bifurcated plate 19, wherein the associated "V" shaped notch 20 includes a capture opening 35 formed at the apex of the notch 20, and typically of a diameter substantially equal to one-eight inch to two-seventhirty-seconds of an inch, with five-thirty-seconds of an inch being of an optimum dimensional configuration for the diameter of the capture opening 35. The opening 35 in this manner assists in securing weeds within the notch 20 prior to their being removed from the associated soil area of their growth.

Further, it is understood that the edges defining the notch 20 are typically beveled at a forty-five degree angle to assist in a severing as well as a pulling action upon the weeds to assist in their trimming and removal from a soil area. It is understood also that the use of the ring 34 permits the belt 33 a greater degree of adjustability relative to an individual's ankle and heel, and accordingly permits adjustment of the intersection of the cross-over of the belt 33 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A weed puller apparatus for selective securement to a shoe member worn on an individual's foot, wherein the apparatus includes, an elongate brace means for accommodating the shoe thereon having an elongate arcuate top brace slidably mounted in overlying alignment with an elongate arcuate bottom brace, the top brace including an arcuate concave forward brace member mounted thereon; the bottom brace including an arcuate concave rear brace member mounted thereon wherein the forward brace member and the rear brace member are in confronting relationship relative to each other to receive the shoe, and wherein the arcuate bottom brace is adjustably and slidably mounted underlying the arcuate top brace, the arcuate top and bottom braces are each defined by predetemrined radius of curvature, and the bottom brace includes an upwardly projecting boss member, and the top brace includes an elongate slot to receive said boss member, and a fastening member is directed through said slot and received within said bottom brace to secure the top brace adjustably and slidably relative to the bottom brace, and an arcuate forward notched member extending forwardly of the forward brace member and aligned with the top brace, and wherein the forward notched member is defined by an arcuate first plate formed with a first notch at a forward end thereof, and wherein the arcuate bottom brace includes an arcuate rear notched member extending rearwardly of the rear brace member in alignment with the bottom brace defined by an arcuate second plate formed with a second notch at a rearward end thereof and wherein the first plate is deposed by a radius of curvature equal to the predetermined radius of curvature, and wherein the forward notched member is defined by a radius of curvature equal to the predetermined radius of curvature, and and strap means for securing the forward and rear brace members to said shoe, and wherein the top brace includes a plurality of aligned first wing members extending on either side of the top brace adjacent the forward brace member, and each first wing member of said first wing members includes a slot, and the strap means includes an insole flexible strap received through each slot for surroundingly engaging an insole portion of the shoe, and wherein the strap means includes a heel strap member secured to the rear brace member for overlying the ankle portion of the shoe, and wherein the respective first and second notch of the respective forward and rear notched members are each defined by a "V" shaped notch including a cylindrical opening positioned at an apex of each "V" shaped notch.

* * * * *